United States Patent [19]

Lee et al.

[11] Patent Number: 4,645,657

[45] Date of Patent: Feb. 24, 1987

[54] PRODUCTION OF CARBON BLACK

[75] Inventors: Kam B. Lee, Chelmsford; Alan A. Simpkin, Wayland, both of Mass.

[73] Assignee: Cabot Corporation, Boston, Mass.

[21] Appl. No.: 626,703

[22] Filed: Jul. 2, 1984

Related U.S. Application Data

[63] Continuation-in-part of Ser. No. 564,707, Dec. 23, 1983, abandoned.

[51] Int. Cl.$^4$ .................. C01B 31/02; C09C 1/48
[52] U.S. Cl. ................... 423/457; 423/450; 423/455; 423/456
[58] Field of Search .......... 423/449, 450, 455, 456, 423/457

[56] References Cited

U.S. PATENT DOCUMENTS

| | | | |
|---|---|---|---|
| Re. 28,974 | 9/1976 | Morgan et al. | 423/450 |
| 2,599,981 | 6/1952 | Ekholm | 423/455 |
| 2,659,662 | 11/1953 | Heller | 423/457 |
| 2,659,663 | 11/1953 | Heller | 423/457 |
| 2,768,067 | 10/1956 | Heller | 423/456 |
| 3,046,096 | 7/1962 | Heller et al. | 423/456 |
| 3,079,236 | 2/1963 | Heller et al. | 423/456 |
| 3,490,869 | 1/1970 | Heller | 423/455 |
| 3,922,335 | 11/1975 | Jordan et al. | 423/455 |
| 3,952,087 | 4/1976 | Antonsen et al. | 423/450 |
| 4,391,789 | 7/1983 | Estopinal | 423/450 |
| 4,540,560 | 9/1985 | Henderson et al. | 423/445 |

FOREIGN PATENT DOCUMENTS 0102072  3/1984  European Pat. Off. .

*Primary Examiner*—Gregory A. Heller
*Attorney, Agent, or Firm*—Jack Schuman; Lawrence A. Chaletsky

[57] ABSTRACT

This disclosure relates to an improved furnace process for producing carbon blacks by the incomplete combustion of hydrocarbonaceous feedstock wherein the resultant blacks have decreased tinting strengths and have properties which impart improved hysteresis to rubber formulations in which the blacks are incorporated.

9 Claims, No Drawings

PRODUCTION OF CARBON BLACK

This application is a continuation-in-part of U.S. application Ser. No. 564,707, filed Dec. 23, 1983 now abandoned.

This invention relates to the production of furnace blacks having many important applications. These include use as fillers, pigments, and reinforcing agents in rubber and in plastics. In general, the furnace process for preparing carbon blacks involves a cracking and/or incomplete combustion of a hydrocarbon feedstock such as natural gas or cycle stock in an enclosed conversion zone at temperatures above 1256° K. (1800° F.) to produce carbon black. The carbon black entrained in the gases emanating from the conversion zone is then cooled and collected by any suitable means commonly used in the industry. It is also desirable to produce furnace blacks of similar properties capable of imparting improved hysteretic properties to rubber formulations. Moreover, in certain instances, it is very beneficial to have a method for regulating or controlling the tinting strength of carbon blacks.

Accordingly, the primary object of this invention is to provide a novel and improved process for preparing carbon blacks wherein the tinting strength of the carbon blacks is controlled.

A further object of this invention is to provide an improved process for preparing carbon blacks having lower tinting strengths.

Other and different objects, advantages and features of the present invention will become apparent to those skilled in the art upon consideration of the following detailed description and claims.

In accordance with this invention, it has been found that the above and still further objects are achieved by modifying a modular or staged process for producing carbon black of the type disclosed and claimed in U.S. Pat. No. Reissue 28,974. The staged process consists of an initially prepared primary (first-stage) combustion zone wherein a stream of hot gaseous combustion products is formed; a second or transition zone wherein a liquid hydrocarbon feedstock in the form of solid streams (coherent jets) is injected substantially transversely from the outer or inner periphery of the combustion gas stream into the pre-formed stream of hot gases; and a third zone (the reaction zone) wherein the carbon black formation occurs prior to termination of the reaction by quenching.

In processes of the aforementioned type where feedstock is injected from the outer periphery of the combustion gas stream, there is a possibility for combustion gases to pass through the system without having been utilized. This will occur, for example, when the hydrocarbon feedstock does not completely fill the area through which the combustion gases are flowing, thereby permitting unused heat in the form of combustion gases to escape. There is a greater tendency for this to occur as the size of the reactor is increased. To prevent this uneconomic loss of combustion gases, it is disclosed in U.S. Pat. No. 3,922,335 to inject additional feedstock into the interior region of the combustion gas stream where the feedstock injected from the outer periphery of the transition zone would not reach. The patent describes the use of a suitable device such as a probe, through which the additional liquid hydrocarbon feedstock would be injected into the core of the combustion gas stream in a substantially transverse manner, and in a direction from the center or core of the combustion gas stream outwardly toward the walls of the reactor. By so doing, it is shown that the combustion gases will be thoroughly utilized for the intended purposes of shearing, atomizing, and dispersing the oil droplets. The injection of feedstock into the interior region of the combustion gas stream occurs in the same plane as that from which the feedstock is injected from the outer periphery of the transition zone toward the interior of the combustion gas stream. The process described in U.S. Pat. No. 3,922,335 is shown to provide exceptionally high throughput and high yields, and to have the ability to produce high quality carbon blacks.

There are instances, however, where it is desired to produce carbon blacks in a manner similar to the above process but to produce blacks having different properties. In particular, it may be desirable to produce carbon blacks having good hysteretic properties and a lower-than-normal tinting strength. The modification of the present modular or staged process which makes possible the preparation of the blacks having improved hysteresis and controlled tinting strength involves injecting a portion of the liquid hydrocarbon feedstock substantially radially, in the form of solid streams, into the combustion gas stream from the periphery thereof at a location where the combustion gas stream has not attained maximum velocity, i.e., prior to approximately the mid-point of the transition zone. The feedstock is injected through unobstructed orifices from the outer or inner periphery of the combustion gas stream substantially radially into the lower velocity stream. It is preferred, however, to inject the feedstock into the lower velocity combustion gas stream from the inner periphery radially outwardly into the combustion gas stream. In the present staged process, maximum velocity of the combustion gas stream is reached at approximately the mid-point of the transition zone. Thus, for example, when the injection is being made through a probe, the modification can be carried out by inserting the probe into the first or primary combustion zone so that the feedstock enters a combustion gas stream having a lower velocity. The actual point or plane where the feedstock is injected into the lower velocity combustion gas stream may be varied considerably depending upon the specific grade or type of carbon black desired.

In the preparation of the hot combustion gases employed in preparing the blacks of the present invention, there are reacted in a suitable combustion chamber a liquid or gaseous fuel and a suitable oxidant stream such as air, oxygen, mixtures of air and oxygen or the like. Among the fuels suitable for use in reacting with the oxidant stream in the combustion chamber to generate the hot combustion gases are included any of the readily combustible gas, vapor or liquid streams such as hydrogen, carbon monoxide, methane, acetylene, alcohols, and kerosene. It is generally preferred, however, to utilize fuels having a high content of carbon-containing components and, in particular, hydrocarbons. For example, streams rich in methane such as natural gas and modified or enriched natural gas are excellent fuels as well as other streams containing high amounts of hydrocarbons such as various hydrocarbon gases and liquids and refinery by-products including ethane, propane, butane, and pentane fractions, fuel oils and the like. As referred to herein, the primary combustion represents the amount of oxidant used in the first stage of the modular process relative to the amount of oxidant theoretically required for the complete combustion of the first stage hydrocarbon to form carbon dioxide and water. In this manner, there is generated a stream of hot combustion gases flowing at a high linear velocity. It has furthermore been found that a pressure differential between the combustion chamber and the reaction chamber of at least 1.0 p.s.i. (6.9 kPa) and preferably of about 1.5 p.s.i. (10.3 kPa) to 10 p.s.i. (69 kPa), is desirable. Under these conditions, there is produced a stream of gaseous combustion products possessing sufficient kinetic energy to atomize a carbon black-yielding liquid hydrocarbonaceous feedstock sufficiently well to produce the desired carbon black products. The resultant combustion gas stream emanating from the primary combustion zone attains a temperature of at least about 2400° F. (1316° C.), with the most preferable temperatures being at least above about 3000° F. (1649° C.). The hot combustion gases are propelled in a downstream direction at a high linear velocity which is accelerated by introducing the combustion gases into an enclosed transition stage of smaller diameter which may, if desired, be tapered or restricted such as by means of a conventional venturi throat.

In the present process the remaining portion of the total amount of liquid feedstock utilized is injected from the inner or outer periphery of the combustion gas stream in a substantially radially outward or inward direction into the combustion gases at the point where the combustion gas stream has reached maximum velocity i.e., approximately the mid-point of the transition zone. The feedstock is injected substantially radially in the form of solid streams through unobstructed orifices at the transition zone into the combustion gases from the outer or inner periphery thereof, with preference for injection from the outer periphery of the combustion gas stream. By means of this technique for injecting the liquid feedstock, carbon blacks are produced which are capable of imparting improved hysteresis to rubber compounds.

In the second stage of the process, the combustion gases are flowing at high velocity and there exists a gas kinetic head of at least about 1.0 p.s.i. (6.9 kPa). The liquid carbon black-yielding hydrocarbon feedstock which is injected into the combustion gases in the transition or second zone, must be injected under sufficient pressure to achieve proper penetration thereby insuring a high rate of mixing and shearing of the hot combustion gases and the liquid hydrocarbon feedstock. The liquid feedstock is injected substantially transversely from the outer or inner periphery of the stream of hot combustion gases in the form of a plurality of solid streams (coherent jets) which penetrate well into the interior region, or core, of the stream of combustion gases.

Suitable for use herein as hydrocarbon feedstocks which are readily volatilizable under the conditions of the reaction are unsaturated hydrocarbons such as acetylene; olefins such as ethylene, propylene and butylene; aromatics such as benzene, toluene and xylene; certain saturated hydrocarbons; and volatilized hydrocarbons such as kerosene, naphthalenes, terpenes, ethylene tars, aromatic cycle stocks and the like.

The third stage of the modular process is a reaction zone which will permit sufficient residence time for the carbon black forming reaction to occur prior to termination of the reaction by quenching. The residence time in each instance depends upon the particular conditions of the process and the particular black desired.

Subsequent to the carbon black forming reaction having proceeded for the desired period of time, the reaction is terminated by spraying thereon a quench liquid, such as water, using at least one set of spray nozzles. The hot effluent gases containing the carbon black products suspended therein are then passed downstream where the steps of cooling, separating and collecting the carbon black are carried out in conventional manner. For example, the separation of the carbon black from the gas stream is readily accomplished by conventional means such as a precipitator, cyclone separator, bag filter, or combinations thereof.

When practicing the present invention, the amount of feedstock injected into the primary combustion zone and at the point where the combustion gases have reached maximum velocity are any amounts or proportions which contribute to the process yielding carbon blacks having lower tinting strength values, and which will impart improved hysteretic properties to rubber compositions containing the blacks. It is preferred to inject an amount of from about 20 to about 80% of the feedstock prior to the point where the combustion gas stream has reached maximum velocity, with the remaining amount of the feedstock being injected at the point in the transition zone where the combustion gas stream has reached maximum velocity. In a particularly preferred embodiment, an amount of from about 40 to about 60% of the feedstock is injected prior to the point where the combustion gas stream has reached maximum velocity, with the remaining amount of the feedstock being injected at the point in the transition zone where the combustion gas stream has reached maximum velocity.

When practicing the present staged reactor process having feedstock injected at more than one plane or point, the orifices through which the feedstock is injected have been previously arranged or located in a manner such that the angles are bisected. By so doing, feedstock is injected over a wider cross-sectional area of the combustion gas stream. It has now been found, however, that rotation of the angle of the orifices through which the feedstock is injected from an angle of less than 60° in a direction leading toward an overlapping of the orifices where the angle is 0° results in the preparation of carbon blacks having a markedly reduced tinting strength. It is preferred that the angle between the orifices range from 0° to about 30°, with the most preferred angle being 0°. The orifices which are rotated may either be those through which feedstock is injected into the combustion gas stream at the point of maximum velocity or those used for injecting feedstock into the lower velocity combustion gas stream. It is preferred, however, to rotate the orifices through which feedstock is injected into the lower velocity combustion gas stream.

The following testing procedures are used in evaluating the analytical and physical properties of the blacks produced by the present invention.

IODINE ADSORPTION NUMBER

This is determined in accordance with ASTM D-1510-70.

TINT STRENGTH

The tint strength of a carbon black sample is determined relative to an industry tint reference black in accordance with ASTM D3265-76a.

DIBUTYL PHTHALATE (DBP) ABSORPTION NUMBER

The DBP absorption number of a carbon black is determined in accordance with ASTM D 2414-76. The results reported indicate whether or not the carbon black is in fluffy or pellet form.

CRUSHED DBP ABSORPTION NUMBER (CDBP)

A carbon black pellet is subjected to a crushing type action and the structure is then measured in accordance with ASTM D-3493-79.

MODULUS AND TENSILE

These physical properties are determined in accordance with the procedures described in ASTM D-412. In brief, the modulus measurement relates to the pounds per square inch pull observed when a sample of vulcanized rubber is stretched to 300% of its original length. The tensile measurement is a determination of the number of pounds per square inch pull required to rupture or break a sample of vulcanized rubber in a tension test.

EXTRUSION SHRINKAGE

This is determined in accordance with ASTM D-2230-37 (Method B).

REBOUND

This is determined in accordance with the procedure set forth in ASTM D-1054.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLE 1

In this example there is employed a suitable reaction apparatus provided with means for supplying combustion gas-producing reactants, i.e., a fuel and an oxidant, either as separate streams or as precombusted gaseous reaction products to the primary combustion zone, and also means for supplying the carbon black-yielding hydrocarbonaceous feedstock which are movable both longitudinally and circumferentially so as to permit the adjustment of the location of the radially inward or outward injection of feedstock into the combustion gas stream. The apparatus may be constructed of any suitable material such as metal and either provided with refractory insulation or surrounded by cooling means such as a recirculating liquid which is preferably water. Additionally, the reaction apparatus is equipped with temperature and pressure recording means, means for quenching the carbon black-forming reaction such as srpay nozzles, means for cooling the carbon black product and means for separating and recovering the carbon black from other undesired by-products. In carrying out the present example, any suitable burner may be utilized in the primary or first stage combustion in which a primary combustion of 240% may be obtained. The first stage combustion gases having a 240% primary combustion, are formed by charging into the combustion zone of the apparatus air preheated to 680° F. (633° K.) at a rate of 400 k.s.c.f.h. (3.146 m³/sec), and natural gas at a rate of 17.2 k.s.c.f.h. (0.135 m³/sec) thereby generating a stream of combustion gases flowing in a downstream direction at a high linear velocity. One-half the amount of a suitable liquid hydrocarbonaceous feedstock, which is being introduced at a total flow rate of 630 g.p.h. (0.662 l/sec) through 3 unobstructed orifices each of which has a size of 0.089 inch (2.26 mm), is introduced radially outwardly as solid streams into the combustion gas stream at a point 14 inches (355.6 mm) upstream of the plane where the combustion gas stream reaches maximum velocity, i.e. approximately the midpoint of the transition zone. The rapidly flowing stream of combustion gases passes into a second or transition zone which is of smaller cross-sectional diameter in order to increase the linear velocity of the stream of combustion gases. The remaining half of the liquid feedstock is then introduced substantially transversely in the form of solid streams into the resultant stream of hot combustion gases from the outer periphery inwardly toward the core of the combustion gases through 3 unobstructed orifices each of which has a size of 0.089 inch (2.26 mm) at approximately the mid-point of the transition zone where maximum velocity of the combustion gas stream is reached. The transition zone of the apparatus has a diameter of 10.4 inches (264 mm) and a length of 11 inches (279 mm). The reactor section has a diameter of 18 inches (457 mm) and the reaction is terminated by quench at a point 7 ft (2.13 m) downstream of the plane where the combustion gas stream has reached maximum velocity, i.e. approximately the midpoint of the transition zone. The reaction is carried out such that the overall combustion of the process is 35%. In this example the orifices through which feedstock was introduced into the lower velocity combustion gas stream were located circumferentially in such a way that the injection of feedstock occurred at an angle of 60° relative to the orifices through which the feestock was introduced at approximately the mid-point of the transition zone. The analytical and performance characteristics of this black are reported in Tables I–III wherein this black is utilized as a control for the black of Example No. 2.

EXAMPLE 2

Following the procedure of Example 1, and utilizing the same apparatus, there are charged into the primary combustion zone, air preheated to 700° F. (644° K.) at a rate of 400 k.s.c.f.h. (3.146 m³/sec) and natural gas at a rate of 17.2 k.s.c.f.h. (0.135 m³/sec), to produce the desired 240% first stage combustion fire. 60% of the liquid feedstock, which is being introduced at a total flow rate of 625 g.p.h. (0.657 l/sec), is then introduced from the inner periphery radially outwardly into the combustion gas stream at a location which is 14 inches (355.6 mm) upstream of the point where the combustion gas stream has attained its maximum velocity. The feedstock utilized herein is an EXXON oil having carbon content of 88.6% by weight, a hydrogen content of 7.82% by weight, a sulfur content of 3.2% by weight, a hydrogen to carbon ratio of 1.05, a BMCI correlation index of 128, a specific gravity in accordance with ASTM-D-287 of 1.09, an API gravity in accordance with ASTM-D-287 of −1.1, an SSU viscosity (ASTM-D-88) at 130° F. of 292, an SSU viscosity (ASTM-D-88) at 210° F. of 55 and an asphaltenes content of 4.3% by weight. The feedstock is injected as solid streams in a radial direction through 3 unobstructed orifices each of which has a diameter of 0.10 inch (2.54 mm). The remaining 40% of the liquid feedstock is introduced radially inwardly as solid streams into the combustion gas stream from the outer periphery thereof through 3 unobstructed orifices each of which has a size of 0.078 inch (1.98 mm) at the point where the combustion gas stream has reached maximum velocity i.e., approximately the mid-point of the transition zone. The reaction is carried out at an overall percent combustion of 35.2%, and the reaction is quenched with water at a point 7 feet (2.13 m) downstream of the plane where maximum velocity of the combustion gas stream is reached. In this instance, the orifices through which the feedstock is injected into the lower velocity combustion gas stream are located circumferentially in such a manner that the feedstock is injected at an angle of 15° relative to the orifices through which the feedstock is injected into the combustion gas stream from the mid-point of the transition zone. The analytical and physical properties of the blacks are reported in Tables I-III.

TABLE 1

| ANALYTICAL PROPERTIES | | |
|---|---|---|
| Example No. | 1 | 2 |
| Iodine No., mgI$_2$/g black | 107 | 105 |
| Tinting Strength, % | 112 | 109 |
| DBP Absorption, pellets, cc/100 g | 127 | 124 |
| CDBP (24M4) cc/100 g | 104 | 102 |

The suitability of the blacks of the present invention as low-hysteretic reinforcing agents for rubber compositions is clearly shown in the following tables. In evaluating the blacks, the rubber formulations are readily prepared by conventional methods. For example, the rubber and the carbon black are intimately admixed together on a conventional mixing machine of the type normally used for mixing rubber or plastics such as a Banbury mixer and/or roll mill in order to insure satisfactory dispersion. The rubber formulations are compounded according to standard industry formulations for a natural rubber and synthetic rubber-containing formulation. The resulting vulcanizates are cured for the time specified in determining the particular physical property. In evaluating the performance of the carbon blacks of the present invention, the following formulations are utilized wherein the quantities are specified in parts by weight.

TABLE II

| | RUBBER FORMULATIONS | |
|---|---|---|
| Ingredient | Formulation A Natural Rubber Recipe ASTM-D-3192-79 | Formulation B Synthetic Rubber Recipe ASTM-D-3191-79 |
| Polymer | (Natural rubber) 100 | (SBR 1500 - 23.5% styrene, 76.5% butadiene) 100 |
| Zinc Oxide | 5 | 3 |
| Sulfur | 2.5 | 1.75 |
| Stearic Acid | 3 | 1 |
| Mercaptobenzothiazyl disulfide | 0.6 | — |
| N—tert-butyl-2 benzothiazole sulfenamide | — | 1 |
| Carbon Black | 50 | 50 |

TABLE III

| Physical Properties of Natural And Synthetic Rubber Vulcanizates | | |
|---|---|---|
| Carbon Black Sample | Ex. 1* | Ex. 2* |
| FORMULATION A (Natural Rubber ASTM-D-3192-79) | | |
| 300% Modulus, 30 min., psi | +180 | +175 |
| 300% Modulus, 30 min., (MPa) | (+1.241) | (+1.207) |
| Tensile, 30 min., psi | −18 | −80 |
| Tensile, 30 min., (MPa) | (−0.124) | (−0.552) |
| Rebound, 40 min, % | −5.5 | −4.2 |
| FORMULATION B (SBR 1500) ASTM-D-3191-79) | | |
| 300% Modulus, 35 min., psi | +38 | −100 |
| 300% Modulus, 35 min., (MPa) | (+0.262) | (−0.690) |
| 300% Modulus, 50 min., psi | +125 | −40 |
| 300% Modulus, 50 min., (MPa) | (+0.862) | (−0.276) |
| Tensile, 50 min., psi | −10 | −225 |
| Tensile, 50 min., (MPa) | (−0.069) | (−1.552) |
| Extrusion Shrinkage, % | 89 | 90 |
| Rebound, 60 min, % | −4.3 | −3.8 |

*The data are given relative to IRB No. 5

A review of the data in Tables I-III reveals that a reduction in the angle between the orifices through which feedstock is injected into the combustion gas stream in the lower velocity area and at the transition zone causes a decrease in the tinting strength of the carbon blacks produced. In addition, it is worthy of note that the values for the rebound properties of both the natural and the synthetic rubber formulations were also improved.

EXAMPLE 3

The procedure and apparatus employed in Example 3 is identical to that of Example 2. In this instance the purpose of the run was to demonstrate the effect of varying the angle between the orifices through which feedstock was injected into the lower velocity combustion gas stream and at the point of maximum velocity. The angle was varied by rotating circumferentially the location of the orifices through which the feedstock was injected into the lower velocity combustion gas stream. In Table IV below, the data observed when varying the angles from a 60° position, to a 30° position, to a 15° position and finally to a 0° position (overlapping) are reported. The data show a trend toward decreasing values for tinting strength as the angle between the orifices in the planes of injection is reduced, with the lowest tinting strength occurring at the overlapping angle position (0°). Moreover, the data reveal a definite trend toward reducing the DBP of fluffy carbon black. Thus, in the present instance the use of the technique functions to control the structure of the carbon blacks by a means other than the use of potassium additives which may adversely affect other properties.

TABLE IV

| Angle Between the orifices through which feedstock is injected, degrees | 60 | 30 | 15 | 0 |
|---|---|---|---|---|
| Iodine No., mgI$_2$/g black | 114 | 111 | 112 | 111 |
| Tinting Strength, % | 113 | 108 | 109 | 107 |
| DBP Absorption, fluffy, cc/100 g | 148 | 140 | 138 | 132 |

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. In a modular process for producing furnace carbon blacks wherein a fuel and an oxidant are reacted in a first zone so as to provide a stream of hot combustion gases possessing sufficient energy to convert a carbon black-yielding liquid hydrocarbon feedstock to carbon black, and wherein in a second zone liquid hydrocarbon feedstock is peripherally injected, in the form of a plurality of solid streams (coherent jets), into the stream of gaseous combustion products at a point where the combustion gas stream has reached maximum velocity, in a direction substantially transverse to the direction of flow of the stream of combustion gases and under sufficient pressure to achieve the degree of penetration required for proper shearing and mixing of the feedstock, and wherein in a third zone the feedstock is decomposed and converted into carbon black prior to termination of the carbon black forming reaction by quenching, and then cooling, separating and recovering the resultant carbon black, the improvement which comprises introducing in the form of a plurality of solid streams a portion of the liquid hydrocarbon feedstock substantially radially into the combustion gas stream from the periphery thereof prior to the point where the stream of combustion gases reaches maximum velocity, introducing the remainder of the feedstock in the form of a plurality of solid streams substantially radially into the combustion gas stream from the periphery thereof at approximately the mid-point of the transition zone where the combustion gas stream has reached maximum velocity, and adjusting the angle between orifices located in different planes through which each portion of the feedstock is introduced to an angle of less than 60° to thereby produce a carbon black having a lower-than-normal tinting strength and which is capable of imparting improved hysteretic properties to rubber compositions.

2. A process as defined in claim 1 wherein the angle between the orifices through which the portions of feedstock are injected ranges from 0° to about 30°.

3. A process as defined in claim 1 wherein the angle between the orifices through which the portions of feedstock are injected is 0°.

4. A process as defined in claim 1 wherein the amount of liquid feedstock which is introduced into the combustion gas stream prior to the point at which the combustion gas stream reaches maximum velocity ranges from about 20 to about 80% of the total amount of feedstock injected, with the remainder of the liquid feedstock being introduced at approximately the mid-point of the transition zone.

5. A process as defined in claim 1 wherein the amount of liquid feedstock which is introduced into the combustion gas stream prior to the point at which the combustion gas stream reaches maximum velocity ranges from about 40 to about 60% of the total amount of feedstock injected, with the remainder of the liquid feedstock being introduced at approximately the mid-point of the transition zone.

6. A process as defined in claim 1 wherein the liquid hydrocarbon feedstock which is injected into the stream of combustion gases prior to the point at which the stream of combustion gases has reached maximum velocity is injected in a substantially transverse direction outwardly from the inner periphery of the combustion gas stream.

7. A process as defined in claim 1 wherein the liquid hydrocarbon feedstock which is injected into the combustion gas stream at the point where maximum velocity is reached is injected in a substantially transverse direction inwardly from the outer periphery of the combustion gas stream.

8. A process as defined in claim 1 wherein the liquid hydrocarbon feedstock which is injected into the stream of combustion gases prior to the point at which the stream of combustion gases has reached maximum velocity is injected in a substantially transverse direction outwardly from the inner periphery of the combustion gas stream, and wherein the liquid hydrocarbon feedstock which is injected into the combustion gas stream at the point where maximum velocity is reached is injected in a substantially transverse direction inwardly from the outer periphery of the combustion gas stream.

9. A process as defined in claim 8 wherein the angle between the orifices through which the portions of feedstock are injected ranges from 0° to about 30°.

* * * * *